(12) United States Patent
Basso et al.

(10) Patent No.: US 7,782,888 B2
(45) Date of Patent: *Aug. 24, 2010

(54) CONFIGURABLE PORTS FOR A HOST ETHERNET ADAPTER

(75) Inventors: Claude Basso, Raleigh, NC (US); Jean Louis Calvignac, Raleigh, NC (US); Chih-jen Chang, Apex, NC (US); Philippe Damon, Raleigh, NC (US); Natarajan Vaidhyanathan, Carroboro, NC (US); Fabrice Jean Verplanken, La Gaude (FR); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 11/953,820

(22) Filed: Dec. 10, 2007

(65) Prior Publication Data

US 2008/0089358 A1    Apr. 17, 2008

Related U.S. Application Data

(63) Continuation-in-part of application No. 11/097,652, filed on Apr. 1, 2005.

(51) Int. Cl.
*H04L 12/28* (2006.01)
(52) U.S. Cl. ...................... 370/419; 370/366
(58) Field of Classification Search ............. 370/366, 370/367, 419, 236
See application file for complete search history.

(56) References Cited

U.S. PATENT DOCUMENTS 1,724,198 A   8/1929   Hauser
4,825,406 A   4/1989   Bean et al.
5,058,110 A   10/1991  Beach et al.
5,172,371 A   12/1992  Eng et al.
5,359,659 A   10/1994  Rosenthal
5,430,842 A   7/1995   Thompson et al.

(Continued)

FOREIGN PATENT DOCUMENTS

WO    WO03049488 A1    6/2003

OTHER PUBLICATIONS

Kung, H.T., Gigabit Local Area Networks: A System Perspective, Apr. 1992, IEE Communications Magazine, vol. 30, Issue 4, pp. 79-89.

(Continued)

*Primary Examiner*—Dang T Ton
*Assistant Examiner*—Kevin Lee
(74) *Attorney, Agent, or Firm*—Jason O. Piche; Jeffrey L. Streets

(57) ABSTRACT

A system and method in accordance with the present invention allows for an adapter to be utilized in a server environment that can accommodate both a 10 G and a 1 G source utilizing the same pins. This is accomplished through the use of a high speed serializer/deserializer (high speed serdes) which can accommodate both data sources. The high speed serdes allows for the use of a relatively low reference clock speed on the NIC to provide the proper clocking of the data sources and also allows for different modes to be set to accommodate the different data sources. Finally the system allows for the adapter to use the same pins for multiple data sources.

25 Claims, 4 Drawing Sheets

U.S. PATENT DOCUMENTS

| | | | |
|---|---|---|---|
| 5,442,802 A | 8/1995 | Brent et al. | |
| 5,752,078 A | 5/1998 | Delp et al. | |
| 5,983,274 A | 11/1999 | Hyder et al. | |
| 5,991,299 A | 11/1999 | Radogna et al. | |
| 6,041,058 A | 3/2000 | Flanders et al. | |
| 6,266,700 B1 | 7/2001 | Baker et al. | |
| 6,400,730 B1 | 6/2002 | Latif et al. | |
| 6,427,169 B1 | 7/2002 | Elzur | |
| 6,650,640 B1 | 11/2003 | Muller et al. | |
| 6,658,002 B1 | 12/2003 | Ross et al. | |
| 6,678,746 B1 | 1/2004 | Russell et al. | |
| 6,724,769 B1 | 4/2004 | Sang | |
| 6,728,929 B1 | 4/2004 | Luong | |
| 6,735,670 B1 | 5/2004 | Bronstein et al. | |
| 6,751,229 B1 | 6/2004 | Waller et al. | |
| 6,754,662 B1 | 6/2004 | Li | |
| 6,788,697 B1 | 9/2004 | Aweya et al. | |
| 6,795,870 B1 | 9/2004 | Bass et al. | |
| 6,822,968 B1 | 11/2004 | Lim | |
| 6,937,574 B1 | 8/2005 | Delaney et al. | |
| 6,954,463 B1 | 10/2005 | Ma et al. | |
| 6,970,419 B1 | 11/2005 | Kalkunte et al. | |
| 6,976,205 B1 | 12/2005 | Ziai et al. | |
| 6,988,235 B2 | 1/2006 | Brown | |
| 7,023,811 B2 | 4/2006 | Pinto | |
| 7,031,304 B1 | 4/2006 | Arberg et al. | |
| 7,062,570 B2 | 6/2006 | Hong et al. | |
| 7,098,685 B1 | 8/2006 | Agrawal et al. | |
| 7,124,198 B2 | 10/2006 | Pinkerton | |
| 7,131,140 B1 | 10/2006 | O'Rourke et al. | |
| 7,134,796 B2 | 11/2006 | Anderson | |
| 7,164,678 B2 | 1/2007 | Connor | |
| 7,218,632 B1 | 5/2007 | Bechtolsheim et al. | |
| 7,251,704 B2 | 7/2007 | Solomon | |
| 7,260,120 B2 | 8/2007 | Kang et al. | |
| 7,269,661 B2 | 9/2007 | Ree et al. | |
| 7,271,706 B2 | 9/2007 | Lee et al. | |
| 7,274,706 B1 | 9/2007 | Nguyen et al. | |
| 7,283,528 B1 | 10/2007 | Lim et al. | |
| 7,286,557 B2 | 10/2007 | Feuerstraeter et al. | |
| 7,292,586 B2 | 11/2007 | Dewan et al. | |
| 7,292,591 B2 | 11/2007 | Parker et al. | |
| 7,295,553 B2 | 11/2007 | Saitoh | |
| 7,298,761 B2 | 11/2007 | Hong | |
| 7,308,006 B1 | 12/2007 | Banerjee et al. | |
| 7,342,889 B2 * | 3/2008 | Harrekilde-Petersen et al. | 370/236 |
| 7,349,399 B1 | 3/2008 | Chen et al. | |
| 7,360,217 B2 | 4/2008 | Melvin et al. | |
| 7,366,194 B2 | 4/2008 | Yu et al. | |
| 2001/0027496 A1 | 10/2001 | Boucher et al. | |
| 2002/0048270 A1 | 4/2002 | Allen et al. | |
| 2003/0026252 A1 | 2/2003 | Thunquest et al. | |
| 2003/0088689 A1 | 5/2003 | Alexander et al. | |
| 2003/0103499 A1 | 6/2003 | Davis et al. | |
| 2003/0154399 A1 | 8/2003 | Zuk et al. | |
| 2003/0196158 A1 * | 10/2003 | Leung | 714/776 |
| 2003/0227920 A1 | 12/2003 | Benayoun et al. | |
| 2004/0022094 A1 | 2/2004 | Radhakrishnan et al. | |
| 2004/0030766 A1 | 2/2004 | Witkowski | |
| 2004/0064590 A1 | 4/2004 | Starr et al. | |
| 2004/0081145 A1 | 4/2004 | Harrekilde-Petersen et al. | |
| 2004/0100952 A1 | 5/2004 | Boucher et al. | |
| 2004/0109465 A1 | 6/2004 | Kim et al. | |
| 2004/0128398 A1 | 7/2004 | Pettey | |
| 2004/0177275 A1 | 9/2004 | Rose et al. | |
| 2004/0218623 A1 | 11/2004 | Goldenberg et al. | |
| 2005/0022017 A1 | 1/2005 | Maufer et al. | |
| 2005/0076136 A1 | 4/2005 | Cho et al. | |
| 2005/0089031 A1 | 4/2005 | Krueger | |
| 2005/0108611 A1 | 5/2005 | Vogt | |
| 2005/0114663 A1 | 5/2005 | Cornell et al. | |
| 2005/0120160 A1 | 6/2005 | Plouffe et al. | |
| 2005/0138357 A1 * | 6/2005 | Swenson et al. | 713/155 |
| 2005/0149677 A1 | 7/2005 | Shimada et al. | |
| 2005/0174153 A1 | 8/2005 | Saeki | |
| 2005/0256975 A1 | 11/2005 | Kaniz et al. | |
| 2006/0031600 A1 | 2/2006 | Ellis et al. | |
| 2006/0120289 A1 | 6/2006 | Cunningham | |
| 2006/0187928 A1 | 8/2006 | McGee et al. | |
| 2006/0216958 A1 | 9/2006 | Yee et al. | |

OTHER PUBLICATIONS

Cunningham, D.G., "The Status of the 10-Gigabit Ethernet Standard," 2001, 27th European Conference on Optical Communication, 2001. ECOC '01, vol. 3, pp. 364-367.

Braden, "Computing the Internet Checksum," RFC 1071, Sep. 1988.

Rijsinghani, "Computing the Internet Checksum via Incremental Update," RFC 1624, May 1994.

Touch, "Implementing the Internet Checksum in Hardware," RFC 1936, Apr. 1996.

Mazzucco, "The Fundamentals of Cache," SystemLogic.Net, Oct. 17, 2000.

Balena, F., "Speed up searched with hash tables," Nov. 13, 2001, DevX.com all pages.

Acayan, Joseph, "Facsimile Transmital", Apr. 22, 2008, Sayer Law Group, LLP, 1 page.

IP.Com, "Reusing a 10Gbps Ethernet Media Access Controller for a 1Gbps/100 Mbps/10Mbps Ethernet," located at www.ip.com, IP.com No. IPCOM000133402D, Jan. 25, 2006, 6 pages.

Adolf, Geier, "Patent Cooperation Treaty:PCT Notification of transmittal of the International Preliminary Report on Patentability (PCT Rule 71.1),"European Patent Office, Apr. 13, 2007, 7 pages.

Rummery, Audrey, "Patent Cooperation Treaty:PCT Notification of Transmittal of the International Search Report and the Written Opinion of the International Searching Authority, or the Declaration (PCT Rule 44.1),"European Patent Office, Jul. 5, 2006, 11 pages.

European Patent Office, "Communication Pursuant to Article 94(3) EPC", Aug. 18, 2009, 6 pages.

\* cited by examiner

CONFIGURABLE PORTS FOR A HOST ETHERNET ADAPTER

CROSS-REFERENCE TO RELATED APPLICATIONS

This application claims the benefit of priority of and is a Continuation In Part of U.S. patent application Ser. No. 11/097,652, filed on Apr. 1, 2005, entitled "Configurable Ports For A Host Ethernet Adapter", and assigned to the assignee of the present invention. This application is also related to copending U.S. patent application Ser. No. 11/097,608, filed Apr. 1, 2005, entitled "Host Ethernet Adapter for Networking Offload in Server Environment", filed on even date herewith and assigned to the assignee of the present invention, U.S. patent application Ser. No. 11/096,363, filed Apr. 1, 2005, entitled "Method and System for Accommodating Several Ethernet Ports and a Wrap Transmitted Flow Handled by a Simplified Frame-By-Frame Upper Structure", and assigned to the assignee of the present invention, U.S. patent application Ser. No. 11/096,571, filed on Apr. 1, 2005, entitled "Method and Apparatus for Providing a Network Connection Table", and assigned to the assignee of the present invention, U.S. patent application Ser. No. 11/097,051, filed Apr. 1, 2005, entitled "Network Communications for Operating System Partitions", and assigned to the assignee of the present invention, U.S. patent application Ser. No. 11/096,365, filed Apr. 1, 2005, entitled "System and Method for Parsing, Filtering, and Computing the Checksum in a Host Ethernet Adapter (HEA)", and assigned to the assignee of the present invention, U.S. patent application Ser. No. 11/096,353, filed Apr. 1, 2005, entitled "System and Method for a Method for Reducing Latency in a Host Ethernet Adapter (HEA)", and assigned to the assignee of the present invention, U.S. patent application Ser. No. 11/097,055, filed Apr. 1, 2005, entitled "Method and Apparatus for Blind Checksum and Correction for Network Transmissions", and assigned to the assignee of the present invention, U.S. patent application Ser. No. 11/096,362, filed Apr. 1, 2005, entitled "Method and System for Performing a Packet Header Lookup", and assigned to the assignee of the present invention, U.S. patent application Ser. No. 11/097,430, filed Apr. 1, 2005, entitled "System and Method for Computing a Blind Checksum in a Host Ethernet Adapter (HEA)", and assigned to the assignee of the present invention, all of which is incorporated herein by reference.

FIELD OF THE INVENTION

The present invention relates generally to a server environment and more specifically to adapters utilized in such an environment.

BACKGROUND OF THE INVENTION

The Internet and its applications have tremendously increased the number of clients' requests a server has to satisfy. Each client's request generates both network and storage I/Os. In addition, the advent of 10 gigabit (G) Ethernet and IP storage makes it possible to consolidate the data center communications on a single backbone infrastructure: Ethernet, TCP/IP.

Adapters are utilized in Network Interface Controllers (NICs) to receive data from 10 G sources. In such an adapter it is also desirable to handle data from other sources. For example there are still a significant number of 1 G sources. However it is a problem to support 1 G ports through the same interface as the 10 G port. The problem is that the 10 G and 1 G interfaces are high speed serial interfaces operating at different rates. Typically to accommodate both types of data sources would require additional pins on the NIC. These additional pins would necessarily increase the cost and complexity of the device.

Accordingly, what is desired is an adapter which can be utilized in a server environment which can accommodate multiple data sources but does not have any of the above-identified problems. The adapter should be easily implemented utilizing existing technologies. The adapter should also be cost effective and easily adapted to existing server environments.

The present invention addresses such a need.

BRIEF SUMMARY OF THE INVENTION

An Ethernet adapter is disclosed. The adapter comprises a plurality of layers for allowing the adapter to receive and transmit packets from and to a processor. The plurality of layers include a high speed serializer/deserializer (high speed serdes) to receive data from and provide data to different speed data sources on the same pins.

A system and method in accordance with the present invention allows for an adapter to be utilized in a server environment that can accommodate both a 10 G and a 1 G source utilizing the same pins used as either 1 G SGMII interface, 10 G XAUI interface, or 10 G XFI interface.

DETAILED DESCRIPTION OF THE INVENTION

Figure 1:
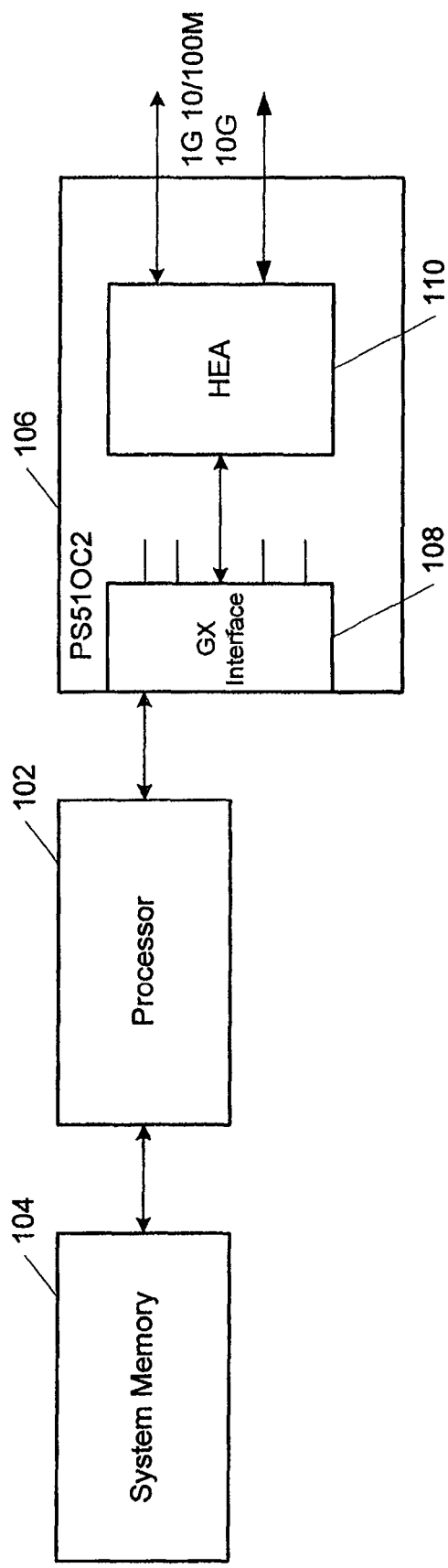
FIG. 1 is a block diagram of a server system in accordance with the present invention.

The present invention relates generally to a server environment and more specifically to adapters utilized in such an environment. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention allows for an adapter to be utilized in a server environment that can accommodate both a 10 G and a 1 G source utilizing the same pins used as either 1 G SGMII interface, 10 G XAUI interface, or 10 G XFI interface. This is accomplished through the use of a high speed serializer/deserializer (high speed serdes) which can accommodate both data sources. The high speed serdes allows for the use of a relatively low reference clock speed on the NIC to provide the proper clocking of the data sources and also allows for different modes to be set to accommodate the different data sources.

A key requirement to implement these different interfaces on the same pins is that the same serdes must be used in all modes, not only to save silicon area and power dissipation, but also because serdes cores are typically implemented as hardware macros that imbed their own connections to external pins, due to the high speed of the signals exchanged externally.

Another typical feature of the serdes cores is that they rely on a reference clock from which are derived per-lane clocks given to the PCS layer for capturing deserialized receive data, but also per-lane companion clocks given to the PCS core for sending transmit data to serialize. This is to keep the serdes core simple and generic with high-speed logic contained within the same clock domain.

Also, a basic implementation constraint of high-speed serdes cores is that they rely on PLLs and Phase Rotators for which the frequency span is limited. PLLs are used for frequency multiplication of the reference clock, and their frequency range is constrained by the bandwidth of the feedback loop that must be limited to minimize noise sensitivity and then minimize jitter. The Phase Rotator detects data transitions via a delay line with multiple taps, and limiting the frequency range also limits the size of this delay line.

These two constraints are accomodated through a "gearbox" function in the serdes that performs a repetition "by N" of the serial data and generating the companion clocks accordingly.

When the serdes is configured as an XFI interface, it exchanges serial data at 10.3125 G. It would require an excessive frequency span for the serdes to exchange data on a XAUI interface (3.125 G) and SGMII interface (1.25 G). Then, when in XAUI mode the serdes is running at 6.25 G and its "gearbox" function performs a repetition "by 2", and when in SGMII mode the serdes is running at 10.0 G and its "gearbox" function performs a repetition "by 8", thereby limiting the frequency span between 6.25 and 10.3125 GHz.

The repetition scheme operates at bit level: in the transmit direction, the same bit is serialized and transmitted N times back-to-back; in the receive direction, the deserializer receives N identical bits back-to-back and only one of them is captured.

To more particularly describe the features of the present invention refer now to the accompanying drawings in conjunction with the accompanying Figures.

FIG. 1 is a block diagram of a server system 100 in accordance with the present invention. The server system 100 includes a processor 102 which is coupled between a memory 104 and an interface adapter chip 106. The interface adapter chip 106 includes an interface 108 to the private (Gx) bus of the processor 102 and a Host Ethernet Adapter (HEA) 110. The HEA 110 receives and transmits signals from and to the processor 102.

The HEA 110 is an integrated Ethernet adapter. A set of accelerator features are provided such that a server TCP/IP stack uses those features when and as required. The interface between the processor 102 and the interface adapter chip 106 has been streamlined by bypassing the PCI bus and providing interface techniques that enable demultiplexing and multi-queueing and packet header separation. In so doing an Ethernet adapter is provided that allows for improved functionality with high speed system while allowing for compatibility with legacy server environments.

Figure 2:
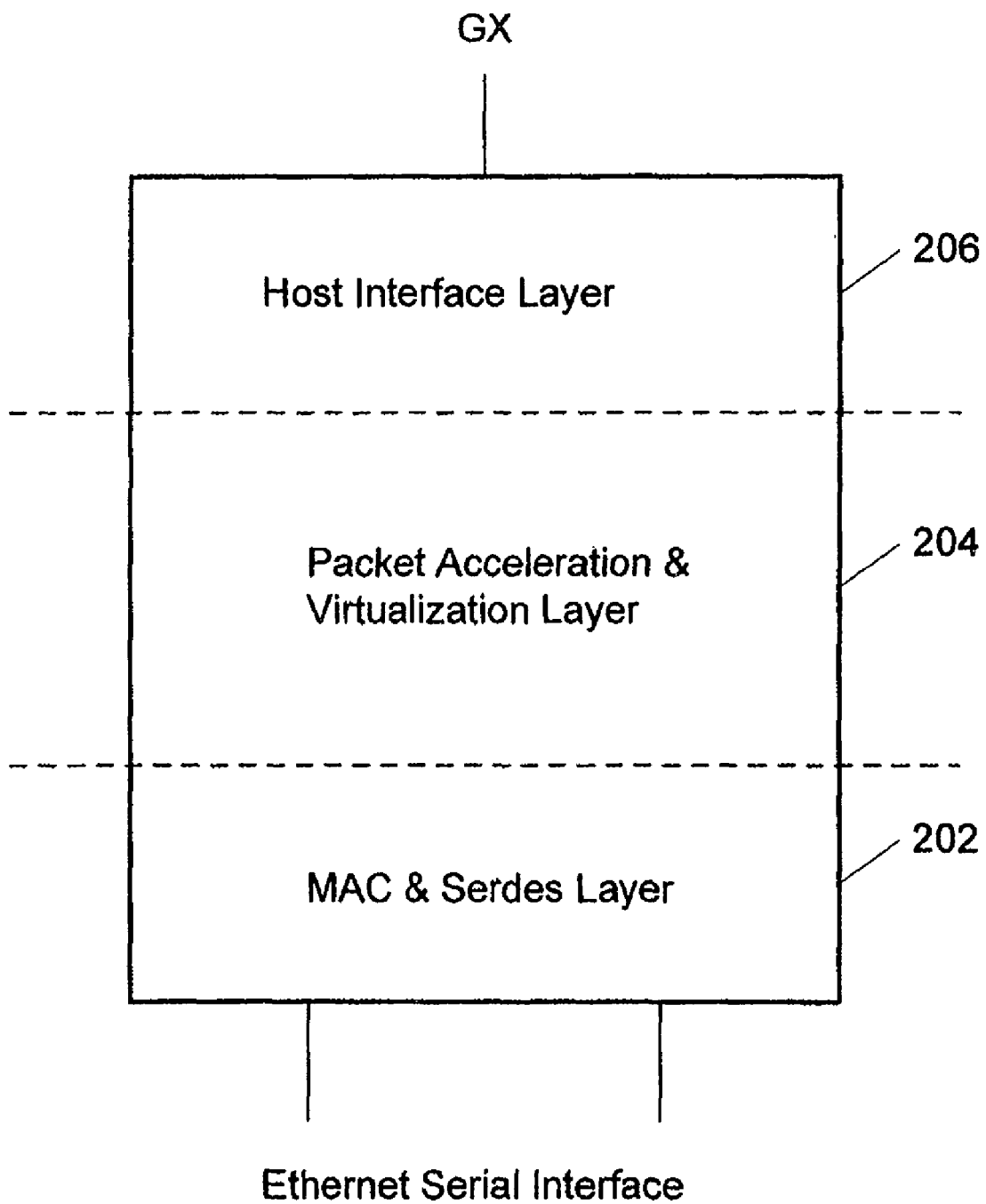
FIG. 2 is a simple block diagram of the a Host Ethernet Adapter (HEA) in accordance with the present invention.

FIG. 2 is a simple block diagram of the HEA 110 in accordance with the present invention. As seen, the HEA 110 has a three layer architecture. The first layer comprises a Media Access Controller (MAC), Physical Coding Sublayer (PCS) and Serialization/Deserialization (Serdes) layer 202 which provides a plurality of interfaces from and to other devices on the Ethernet network. In the layer 202 the same chip I/Os are used to provide a plurality of interfaces. For example, in a preferred embodiment, the same chip I/Os are utilized to provide either a 10 Gigabit interface or multiple 1 Gigabit interfaces.

The second layer comprises a Packet Acceleration and Virtualization Layer 204. The layer 204 provides for receiving packets and demultiplexing the flow of packets for enabling virtualization. The layer 204 enables virtualization or partitioning of the operating system of a server based upon the packets. The layer 204 also provides packet header separation to enable zero copy operations and therefore provide improved latency. Also since layer 204 interacts directly with the private bus (Gx) through the Host Interface Layer 206, a low latency, high bandwidth connection is provided.

The third layer comprises the Host Interface Layer 206. The Host Interface Layer 206 provides the interface to the Gx or private bus of the processor and communicates with layer 204. The layer 206 provides for multiple receive sub-queues per Queue Pair (QP) to enable effective buffer management for a TCP stack. The host layer 206 provides the context management for a given flow of data packets.

To describe the features of the HEA 100 in more detail refer now to the following discussion in conjunction with the accompanying figures.

MAC/PCS and Serdes Layer 202

Figure 3:
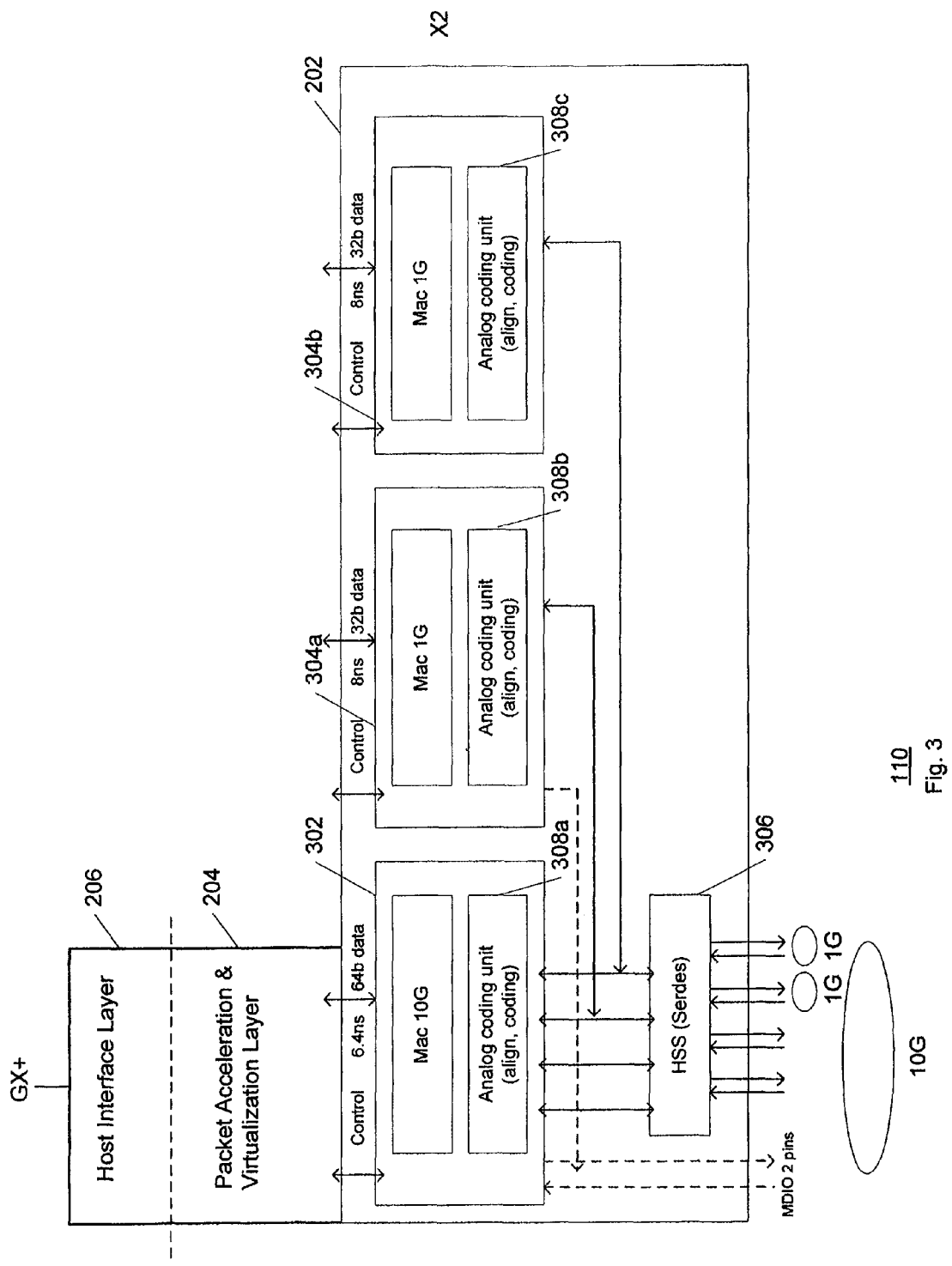
FIG. 3 is a block diagram of the HEA with a more detailed view of the MAC and Serdes Layer.

FIG. 3 is a block diagram of the HEA 110 with a more detailed view of the MAC/PCS and Serdes Layer 202. As is seen in this embodiment there is one 10 Gigabit MAC 302 and two 1 Gigabit MACs 304a and 304b. The MACs 302, 304a and 304b include PCS units 308a, 308b and 308c for aligning and coding the received packets. FIG. 3 shows an implementation example with only one 10 G XAUI interface and two 1 G SGMII interfaces. The MACs 302, 304a and 304b are coupled to a High Speed Serializer/Deserialization (high speed serdes) 306. The high speed serdes 306 is capable of receiving data from and providing data to one 10 G source or four 1 G. As before mentioned the high speed serdes 306 includes a mechanism for ensuring that data from and to the data sources are handled appropriately. To describe this feature more detail refer now to the following discussion in conjunction with the accompanying Figures.

Figure 4:
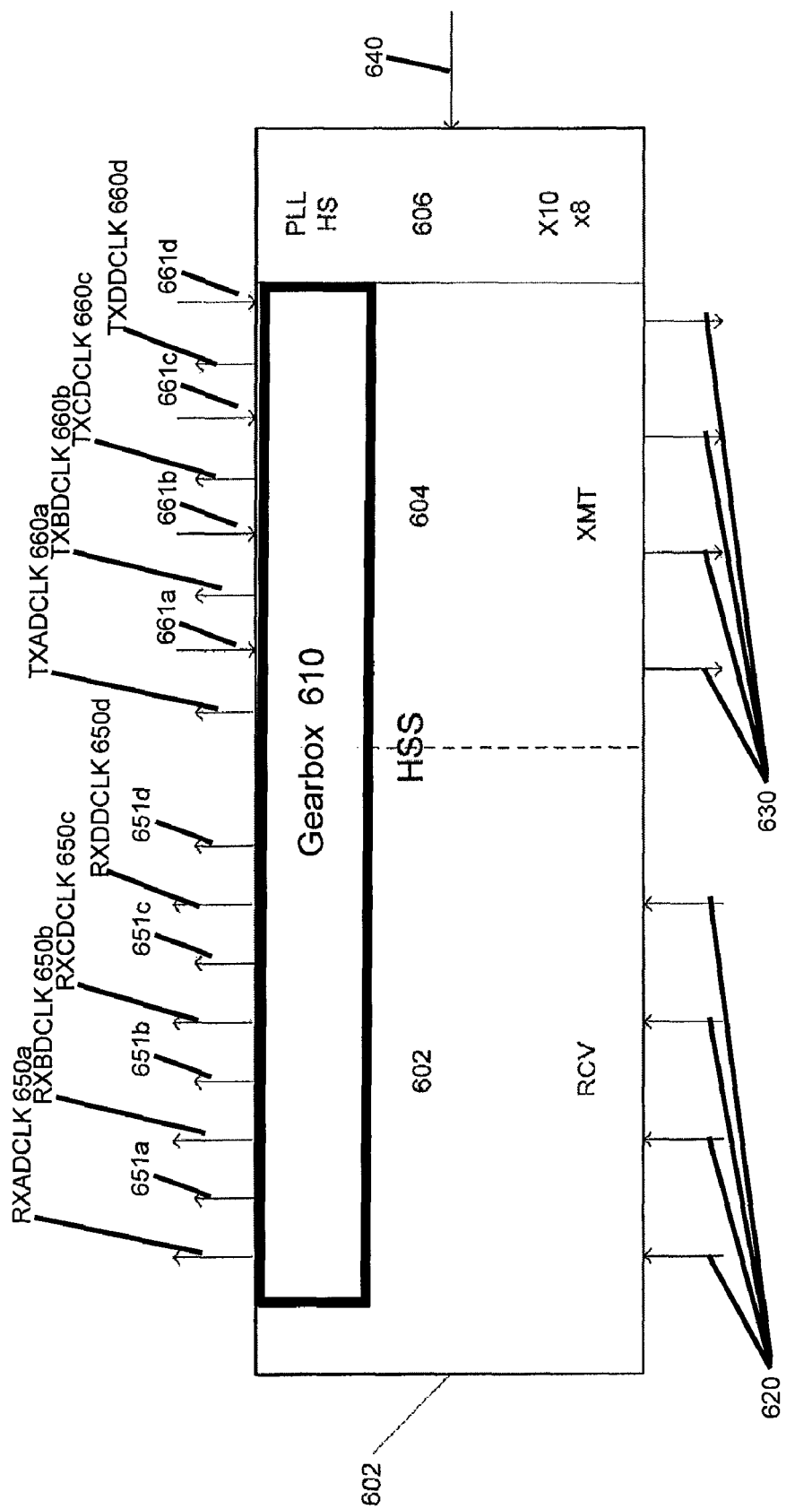
FIG. 4 is a more detailed diagram of the high speed serdes.

FIG. 4 is a more detailed diagram of the high speed serdes 306. As is seen in this embodiment the high speed serdes 306 includes a receive section 602 and a transmit section 604. There are four lanes associated with the high speed serdes 306. Each lane corresponds to one bottom-up arrow 620 and one top-down arrow 630 on the receive section 602 and the transmit section 604 respectively. In this embodiment a 10 G XAUI source requires four lanes, a 10 G XFI source requires one lane, and a 1 G source requires one lane. The high speed serdes 306 also includes a Phase Locked Loop (PLL) 606 which receives a reference clock signal 640 from the NIC. The frequency of the reference clock is relatively low compared to the data sources because the PLL 606 can be set to different frequency multiplication ratios to allow the different data sources. The high speed serdes 306 also can configured to allow for multiple modes of operation. In so doing, the different data sources can be accommodated since the PLL 606 has different multiplication ratios.

Below is an example of the operation of the high speed serdes 306 using a 156.25 MHz reference clock.

10 G XFI interface: data rate is 10.3125 Gbps.

10 G XAUI interface: data rate is 3.125 Gbps.

1 G SGMII interface: data rate is 1.25 Gbps.

The same high speed serdes Ref Clock can be used in all modes, because internal high speed serdes PLL 606 can be set to different frequency multiplication ratios.

10 G XFI interface: PLL multiplication ratio is set to 66 to provide internal high-speed clock at 10.3125 GHz.

10 G XAUI interface: PLL multiplication ratio is set to 40 to provide internal high-speed clock at 6.25 GHz.

1 G SGMII interface: PLL multiplication ratio is set to 64 to provide internal high-speed clock at 10.0 GHz.

When configured as an XFI interface, the serdes 306 operates in a regular mode, running at 10.3125 GHz to handle the serial link running at 10.3125 Gbps.

When configured as a XAUI interface or an SGMII interface, the serdes 306 performs data repetition at bit level 2 and 8 times respectively, without transitions between replicated bits of the serialized transmitted data, so that the serial signal appears to be exchanged at 3.125 Gbps while the serdes operates at 6.25 GHz when in XAUI mode, and to be exchanged at 1.25 Gbps while the serdes runs at 10 GHz when in SGMII mode.

The serdes 306 includes a gearbox 610 that provides to the PCS unit 308 the companion clocks RXADCLK to RXD-DCLK 650 in the receive direction and TXADCLK to TXD-DCLK 660 in the transmit direction. These clocks are derived from the high speed clock of the serdes, after frequency division according to the deserialization ratio, and additional frequency division when the serdes is not in the highest speed mode XFI: when in XAUI mode, the frequency is divided by 2, when in SGMII mode, the frequency is divided by 8.

The serdes 306 exchanges deserialized data with the PCS unit 308 which is implemented in separate units, one unit for each type of interface supported, due to the different types of line codings used in XFI, XAUI, and SGMII interfaces, and also because of the different timing requirements associated with the speed of each of these interface types. This avoids to apply the most stringent timing constraints to a single piece of PCS unit 308 that would have to support all types of interfaces.

The serdes is then connected to the PCS units 308 via fanout buses for companion clocks 650 and 660 and for the receive data 651, and via multiplexed buses driving the transmit data 661.

A system and method in accordance with the present invention allows for an adapter to be utilized in a server environment that can accommodate both a 10 G and a 1 G source utilizing the same pins. This is accomplished through the use of a high speed serializer/deserializer (high speed serdes) which can accommodate all data sources. The high speed serdes allows for the use of a relatively low reference clock speed on the NIC to provide the proper clocking of the data sources and also allows for different modes to be set to accommodate the different data sources. Finally the system allows for the adapter to use the same pins for multiple data sources.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An Ethernet adapter comprising:
a plurality of layers for receiving and transmitting packets from and to a processor; wherein the plurality of layers include a common high speed serializer/deserializer (high speed serdes) for receiving data from and providing data to different speed data sources on the same pins, wherein the high speed serdes is configured in one of several different modes of operation, wherein each of the different modes of operation uses the same reference clock speed and a different phase locked loop multiplication ratio to operate the high speed serdes at a different internal clock rate, and wherein one or more of the different modes further uses data repetition at a bit level to provide a data rate that is different than the internal clock rate for that mode.

2. The Ethernet adapter of claim 1 wherein the different speed data sources comprise a 10 Gigabit (G) source and a plurality of 1 G sources.

3. The Ethernet adapter of claim 1 wherein the high speed serdes comprises:
a receive section for receiving data from a data source;
a transmit section for transmitting data to a data source; and
a phase locked loop (PLL) for controlling the data rate of the transmit and receive sections.

4. The Ethernet adapter of claim 3 wherein the receive section and transmit section share a plurality of lanes.

5. The Ethernet adapter of claim 1 wherein the reference clock speed is 156.25 MHz, and wherein the different modes of operation comprise a 10 G XFI mode using a phase locked loop multiplication ratio of 66 and no data repetition, a 10 G XAUI mode using a phase locked loop multiplication ratio of 40 and data repetition at bit level with each bit being repeated two times, and a 1 G SGMII mode using a phase locked loop multiplication ratio of 64 and data repetition at bit level with each bit being repeated eight times.

6. The Ethernet adapter of claim 1 wherein the high speed serdes includes a mechanism to provide to the layers dedicated to each media speed, receive companion clocks and transmit companion clocks running at the frequency at which the serdes would have run if it was operating at media speed.

7. The Ethernet adapter of claim 3 wherein the PLL controls the internal clock rate by setting different multiplication ratios for each of the different modes of operation.

8. A network interface controller (NIC) comprising:
an interface to a private bus of a processor; and
an Ethernet adapter coupled to the interface; the Ethernet adapter comprising a plurality of layers for receiving and transmitting packets from and to the processor; wherein the plurality of layers include a high speed serializer/deserializer (high speed serdes) for receiving data from and providing data to different speed data sources on the same pins, wherein the high speed serdes is configured in one of several different modes of operation, wherein each of the different modes of operation uses the same reference clock speed and a different phase locked loop multiplication ratio to operate the high speed serdes at a different internal clock rate, and wherein one or more of the different modes further uses data repetition at a bit level to provide a data rate that is different than the internal clock rate for that mode.

9. The NIC of claim 8 wherein the different speed data sources comprise a 10 Gigabit (G) source and a plurality of 1 G sources.

10. The NIC of claim 8 wherein the high speed serdes comprises:
a receive section for receiving data from a data source;
a transmit section for transmitting data to a data source; and
a phase locked loop (PLL) for controlling the data rate of the transmit and receive sections.

11. The NIC of claim 10 wherein the receive section and transmit section share a plurality of lanes.

12. The NIC of claim 8 wherein the reference clock speed is 156.25 MHz, and wherein the different modes of operation comprise a 10 G XFI mode using a phase locked loop multiplication ratio of 66 and no data repetition, a 10 G XAUI mode using a phase locked loop multiplication ratio of 40 and data repetition at bit level with each bit being repeated two times, and a 1 G SGMII mode using a phase locked loop multiplication ratio of 64 and data repetition at bit level with each bit being repeated eight times.

13. The NIC of claim 10 wherein the PLL controls the internal clock rate by setting different multiplication ratios for each of the different modes of operation.

14. The NIC of claim 8 wherein the high speed serdes includes a mechanism to provide to the layers dedicated to each media speed, receive companion clocks and transmit companion clocks running at the frequency at which the serdes would have run if it was operating at media speed.

15. A server comprising:
a processor; the processor including a private bus; and
a network interface controller (NIC) coupled to the private bus, the NIC including an Ethernet adapter; the Ethernet adapter comprising a plurality of layers for allowing the adapter to receive and transmit packets from and to the processor; wherein the plurality of layers include a high speed serializer/deserializer (high speed serdes) to receive data from and provide data to different speed data sources on the same pins, wherein the high speed serdes is configured in one of several different modes of operation, wherein each of the different modes of operation uses the same reference clock speed and a different phase locked loop multiplication ratio to operate the high speed serdes at a different internal clock rate, and wherein one or more of the different modes further uses data repetition at a bit level to provide a data rate that is different than the internal clock rate for that mode.

16. A method for an Ethernet adapter, the Ethernet adapter including a plurality of layers; the method comprising:
utilizing the plurality of layers to receive and transmit packets from and to a processor;
receiving data from and providing data to different speed data sources on the same pins of the Ethernet adapter; and
allowing the configuration of the plurality of layers to different modes of operation; wherein each of the different modes of operation uses the same reference clock speed and a different phase locked loop multiplication ratio to operate the high speed serdes at a different internal clock rate, and wherein one or more of the different modes further uses data repetition at a bit level to provide a data rate that is different than the internal clock rate for that mode.

17. The method of claim 16 wherein allowing the configuration is provided by configuring a common high speed serializer/deserializer (high speed serdes) included within the plurality of layers.

18. The method of claim 16 wherein the different speed data sources comprise a 10Gigabit (G) source and a plurality of 1 G sources.

19. The method of claim 17 wherein the high speed serdes comprises:
a receive section for receiving data from a data source;
a transmit section for transmitting data to a data source; and
a phase locked loop (PLL) for controlling the data rate of the transmit and receive sections.

20. The method of claim 19 wherein the receive section and transmit section share a plurality of lanes.

21. The method of claim 16 wherein the high speed serdes includes a mechanism to provide to the layers dedicated to each media speed, receive companion clocks and transmit companion clocks running at the frequency at which the serdes would have run if it was operating at media speed.

22. The method of claim 16 wherein the reference clock speed is 156.25 MHz, and wherein the different modes of operation comprise a 10 G XFI mode using a phase locked loop multiplication ratio of 66 and no data repetition, a 10 G XAUI mode using a phase locked loop multiplication ratio of 40 and data repetition at bit level with each bit being repeated two times, a 1 G SGMII mode using a phase locked loop multiplication ratio of 64 and data repetition at bit level with each bit being repeated eight times.

23. The method of claim 19 wherein the PLL controls an internal clock rate by setting different multiplication ratios for each of the different modes of operation.

24. The method of claim 19, further comprising:
the transmit section transmitting data with the repeated bits back-to-back; and
the receive section receiving data with the repeated bits back-to-back and capturing only one of the repeated bits.

25. The Ethernet adapter of claim 1, wherein one or more of the different modes does not use data repetition.

* * * * *